Figure 1:
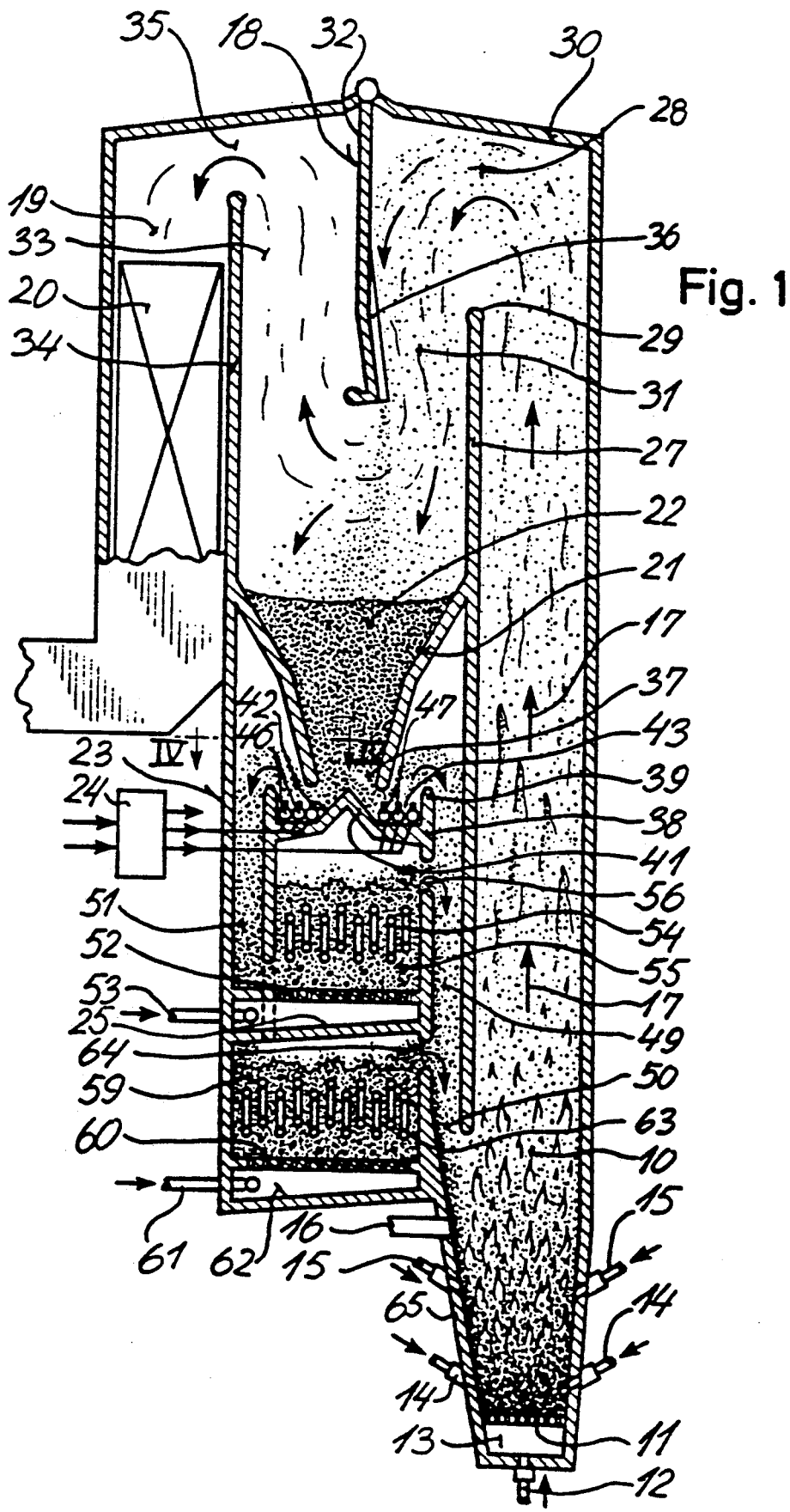

United States Patent [19]
Stoholm

[11] Patent Number: 5,275,788
[45] Date of Patent: Jan. 4, 1994

[54] CIRCULATING FLUIDIZED BED REACTOR

[76] Inventor: Peter Stoholm, Rormosen 7, 1. th., Roskilde, Denmark, DK-4000

[21] Appl. No.: 28,610

[22] Filed: Mar. 8, 1993

Related U.S. Application Data

[63] Continuation of Ser. No. 721,489, Jul. 9, 1991, abandoned.

[30] Foreign Application Priority Data

Nov. 11, 1988 [DK] Denmark ............... 6334/88

[51] Int. Cl.⁵ .................. F27B 15/08; B01J 8/18; F22B 1/00; F23G 5/00
[52] U.S. Cl. .................. 422/145; 422/139; 422/141; 422/146; 422/200; 122/4 D; 110/245; 34/57 A
[58] Field of Search ............ 422/141, 139, 142, 145, 422/146, 147, 200; 122/4; 110/245; 34/57

[56] References Cited

U.S. PATENT DOCUMENTS

| | | |
|---|---|---|
| 4,103,646 | 8/1978 | Yerushalmi et al. |
| 4,111,158 | 9/1978 | Reh et al. |
| 4,154,581 | 5/1979 | Nack et al. ........... 48/197 R |
| 4,165,717 | 8/1979 | Reh et al. |
| 4,548,138 | 10/1985 | Korenberg ........... 110/245 |
| 4,699,068 | 10/1987 | Engström ........... 110/216 |
| 4,709,662 | 12/1987 | Rawdon ........... 122/4 D |
| 4,709,663 | 12/1987 | Larson et al. ........... 122/4 D |
| 4,860,693 | 8/1989 | Jarvstrat . |

FOREIGN PATENT DOCUMENTS

| | | |
|---|---|---|
| 158531B | 5/1990 | Denmark . |
| 0082673 | 6/1983 | European Pat. Off. . |
| 0093063 | 11/1983 | European Pat. Off. . |
| 0226140 | 11/1983 | European Pat. Off. . |
| 0227550 | 7/1987 | European Pat. Off. . |
| 3440583 | 7/1986 | Fed. Rep. of Germany . |
| 854543 | 5/1987 | Finland . |
| 75505 | 3/1988 | Finland . |
| 83/03294 | 9/1983 | PCT Int'l Appl. . |
| 87/03668 | 6/1987 | PCT Int'l Appl. . |
| 84021583 | 6/1984 | Sweden . |
| 460146 | 9/1989 | Sweden . |

Primary Examiner—Robert J. Warden
Assistant Examiner—Christopher Y. Kim
Attorney, Agent, or Firm—Dennison, Meserole, Pollack & Scheiner

[57] ABSTRACT

A circulating fluidized bed reactor comprises a reaction chamber (10) with an upwardly directed flow of gas with entrained particulate solid material, a separator (18) for separating the particles from the gas flow, and a particle recycling system (23) for controlled return of the particles to the reaction chamber (10). The particle recycling system (23) may comprise means (47) for controlled return of the particles in a non-cooled condition and superposed fluid beds (55 and 59) which may be connected in parallel or in series as described for returning particles to the reaction chamber in a more or less cooled condition. The reactor may also render it possible to return various fractions of the particles into the reactor chamber (10) at different levels.

30 Claims, 2 Drawing Sheets

CIRCULATING FLUIDIZED BED REACTOR

This is a continuation of copending application Ser. No. 07/721,489 filed on Jul. 9, 1991, now abandoned.

The present invention relates to a circulating fluidized bed reactor comprising a reactor chamber having means for providing a fluidized bed in the lower part thereof, and gas discharge means communicating with the upper part of the reactor chamber for discharging a flow of gas and particulate solid material therefrom, and including a separator for separating solid material from said flow of gas.

Such reactors may, for example, be used as combustion furnaces, gasifiers, etc. Particulate solid material may then be separated from the flow of gas discharged from the reactor chamber and partly or totally returned to the reactor chamber or the fluidized bed therein. More specifically, the present invention relates to separation and recycling of such particulate solid material which is entrained by the gas flow discharged from the reactor chamber.

EP-B-0,093,063 discloses a reactor of the type described in which the temperature of the fluidized bed of the reactor may be controlled by selectively cooling the particles being recycled. Finnish patent application No. 854543 discloses a reactor in which the recycled particulate solid matter may be returned to the reaction chamber at different levels, and WO 87/03668, EP-A-0,226,140, and Swedish patent application No. 8402158-3 disclose reactors with various types of separators for separating solid material from the gas flow discharged from the reactor.

The present invention provides a reactor of the type described with improved means for separating and/or recycling particulate solid matter to the reactor chamber. Thus, the present invention provides a circulating fluidized bed reactor comprising a reactor chamber having means for providing a fluidized bed in the lower part thereof, gas discharge means communicating with the upper part of the reactor chamber for discharging a flow of gas and particulate solid material therefrom and including a separator for separating solid material from said flow of gas, a passage for recycling separated particulate solid material to the reactor chamber and including a receptacle for receiving separated particulate solid material from the separator so as to accumulate particulate material therein forming a pressure barrier across the recycling passage, particle return means defining at least two separate particle return paths opening into the reactor chamber for returning particles from the receptacle to the chamber, said return means including particle discharge means located adjacent to the bottom part of the receptacle for discharging particles from the receptacle to the respective return paths, and control means for controlling the operation of the particle discharge means.

The particulate material, which is collected in the receptacle, and which forms a pressure barrier between the reactor chamber and the particle return means, defines a common particle supply for two or more particle return paths to which the particulate solid matter may be fed under the control of the control means. Thus, the particle return means of the reactor according to the invention are more versatile than conventional systems. The reactor according to the invention is preferably a combustion furnace, so that the reaction chamber is a combustion chamber. The accumulation of particulate solid materials collected in the receptacle has preferably a relatively large upper surface, so that gases may easily escape from the particulate material, and the height of the particles collected in the receptacle is preferably relatively small. Thus, the height of the particulate solid material collected in the receptacle does preferably not substantially exceed the height necessary to obtain the pressure barrier desired and to secure reasonable replacement of the particles discharged from the bottom part of the receptacle. The maximum cross-sectional area of the receptacle may, for example, be 0.2-2 times the cross-sectional area of the reactor chamber, and preferably, the cross-sectional area of the receptacle is substantially of the same size as the cross-sectional area of the reactor chamber. Accordingly, the total height of the receptacle and the particle return means may be relatively small so that the particle return means may be located at such a high level that the particles may be recycled back into the reactor chamber exclusively under the influence of gravity, if desired.

The particle discharge means may comprise mechanical valve means or the like. In order to reduce repair and maintenance costs it is desired to avoid the use of mechanical valve means. Therefore, the particle discharge means preferably comprise a supporting surface located immediately below a particle discharge opening defined in the bottom part of the receptacle, and gas nozzles for moving particles from the supporting surface into the associated return paths. When the gas nozzles are not operated, particulate solid material from the particle discharge opening of the receptacle is supported and retained by the supporting surface which may have an upwardly raised free edge portion, if desired. When one or more of the gas nozzles is/are operated, so that particulate solid material is blown from the supporting surface into the associated return path, such solid material will be replaced by particulate solid material flowing through the discharge opening of the receptacle.

Preferably, at least one of the return paths comprise means for cooling the particles flowing therealong, and particles may then be recycled to the reactor chamber in a cooled and/or non-cooled condition along a cooled and/or non-cooled return path, respectively. However, part of the particulate solid matter discharged from the receptacle may be withdrawn from the recycling system and transferred to a location outside the reactor, if desired. Similarly, particulate solid matter may be fed into the recycling system when required.

The particle cooling means for one or more return paths may comprise one or more cooling devices located immediately below the receptacle, and these cooling devices are preferably arranged in a superposed relationship, whereby a rather compact and space saving structure may be obtained. One return path may comprise cooling devices arranged at two or more different levels. Alternatively, each return path may comprise one or more cooling devices arranged at the same level. In other words, the cooling devices arranged at different levels in superposed relationship may be connected in series so as to form a single return path, or cooling devices arranged at different levels may be connected in parallel so as to form different return paths. The cooling devices may be arranged at any desired number of levels, and any desired number of cooling devices may be arranged at each level.

The return paths may comprise one or more surface parts along which the particulate solid matter may flow or slide, such as chute-like surface parts, and such surface parts may possibly be cooled or heated (if applicable) by a heat transfer medium, such as water or steam. In the preferred embodiment, however, the return paths comprise fluidizing means for fluidizing the particles passing so as to bring at least some of the particles in contact with one or more of the cooling devices, which may be embedded in the fluidized particles of the bed.

In order to obtain a compact structure, the cooling devices are preferably arranged in a space separated from the reaction chamber by a common partition wall and adjacent to said wall, in which one or more openings is/are defined for connecting the return paths to the reactor chamber. In a preferred embodiment, one or more particle return passages communicating with said connecting openings is/are defined between the partition wall and the adjacent cooling devices. Particles may then be delivered into such return passage or passages from the return path or paths in which the cooling devices are arranged. Under the influence of gravity, the particles may fall down through the return passages from a higher level to the connecting opening or openings, which is/are positioned at a desired lower level. The superposed cooling devices forming part of one of said return paths, may be connected in series and arranged so that particles under the influence of gravity only, may flow from a higher located cooling device into a lower located cooling device, for example through an overflow. Alternatively, diverting means for diverting particles from a higher located cooling device into a lower located cooling device may be provided. This means that two or more return paths containing particle cooling devices and connected in parallel may selectively be connected in series by operating the said diverting means, whereby the possibilities of controlling the operation conditions in the reaction chamber are still further improved.

One or more of the return paths may open into the reaction chamber through an outlet defined in an upright reaction chamber wall, said outlet being shaped so as to direct a flow of particles from said path or paths downwardly and substantially parallel to the upright or substantially vertical chamber wall. This is of importance when it is desired to return the particles to the fluidized bed and to avoid particles from being entrained by the gas flow moving upwardly through the reactor chamber.

Such flow of particles substantially parallel to the upright chamber wall may be obtained by providing some kind of shielding. Thus, the outlet may open into a vertically extending channel or groove formed in the upright chamber wall. It should be understood that such a shielded substantially vertical particle flow could be used not only in connection with the reactor described above, but also in connection with any other conventional or non-conventional reactor.

At least one of the return paths, and preferably a return path for cooled particles, may open into the combustion chamber, above the highest located main supply of combustion air and/or into an oxidizing zone of the combustion chamber. Furthermore, two or more of the return paths may be united into a common path, which opens into the reaction chamber. When the return paths open into the reaction chamber at different levels, such vertically spaced openings are preferably substantially vertically aligned, because a flow of particles falling from such vertically aligned openings will then become united, so that they may better fall right down to the bottom of the reactor chamber without becoming entrained by the upwardly moving gas flow through the reactor chamber. However, in some instances, it may be desirable to distribute the recycled particles across the upwardly moving gas flow in the reactor chamber. Therefore, means may be provided for selectively moving the downwardly directed flow of particles horizontally into the flow of gas and particulate solid material passing upwardly through the reactor chamber. These moving means may, for example, comprise gas nozzles directed into the reactor chamber. By operating these gas nozzles the vertically falling flow of particulate solid material may be blown horizontally into the upwardly directed flow of combustion gas in the reactor. Thereby, the possibility of controlling the operation of the reactor is further improved.

The reactor according to the invention may further comprise at least one opening defined in the upright reaction chamber wall for feeding one or more reactants, such as fuel, into the reaction chamber, said feeding openings being arranged below said particle outlet and adjacent to the downwardly directed flow of particles. This downwardly directed flow of particles will then become united with the reactant or reactants fed into the reaction chamber through said openings, whereby the reactant or reactants will fall downwardly to the bottom of the reaction chamber together with the flow of particles.

The invention also relates to a separator, which may be used not only in connection with a reactor of the present invention, but also in connection with any other conventional or non-conventional reactor of the type described. The separator according to the invention comprises a separator inlet passage, in which the gas flow is directed oppositely to and in converging relationship to the upward gas flow in the reactor chamber, and a separate outlet passage in which the gas flow is directed transversely or oppositely to the gas flow in the inlet passage. When gas flows from the separator inlet passage into the separator outlet passage, the direction of flow will suddenly change through an angle substantially exceeding 90° and, preferably, being about 180°. Furthermore, the cross-sectional area of the separator inlet passage is preferably at the same time decreasing so that the gas flow velocity is increasing. The sudden change of flow direction and the increase of gas flow velocity causes that a substantial part of the entrained solid substances is separated from the gas flow.

The upper part of the reaction chamber may be separated from the separator inlet passage by a common wall, and the separator inlet and outlet passages may also be separated by a common separating wall. The common wall of the reaction chamber and the inlet passage may be substantially vertical, while the common separating wall between the inlet and outlet passages may be directed downwardly towards the reactor chamber, whereby the desired flow direction and decrease of cross-sectional area of the separator inlet passage may be obtained.

When a flow of gas with entrained solid particles is discharged from the reactor chamber into the separator inlet passage, the solid particles will be inclined to impinge the separating wall between the inlet and outlet passages. Therefore, channels or grooves extending substantially in the direction of the gas flow may be formed in the inner wall part of the separator inlet passage facing the reaction chamber. Alternatively or additionally, an upwardly open particle collecting channel may be arranged at the lower free end of the separating wall between the inlet and outlet passages. Particles collected in the collecting channel may be passed to the receptacle of the reactor through channel or tube members aligned with said grooves or channels and extending towards the receptacle. Such collecting channel may alternatively or additionally cause the above flow direction and increased flow rate in the separator inlet passage. The efficiency of the separator may be further improved by a labyrinth separator through which the separator inlet and outlet passages are interconnected. Such labyrinth separator may be formed by downwardly directed, substantially parallel extending sectional members, such as U-sectional members.

Figure 2:
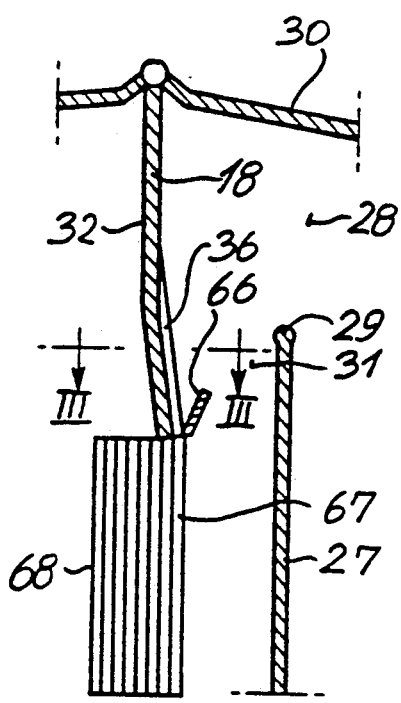
Figure 3:
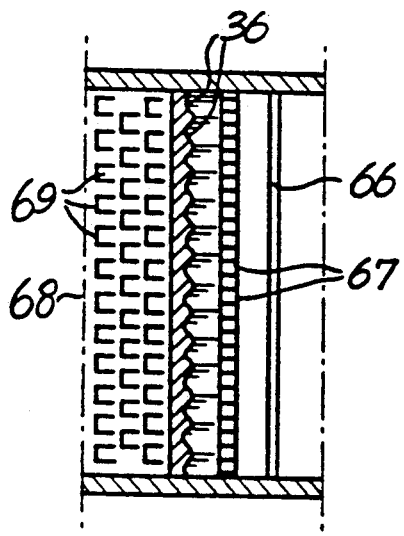
Figure 4:
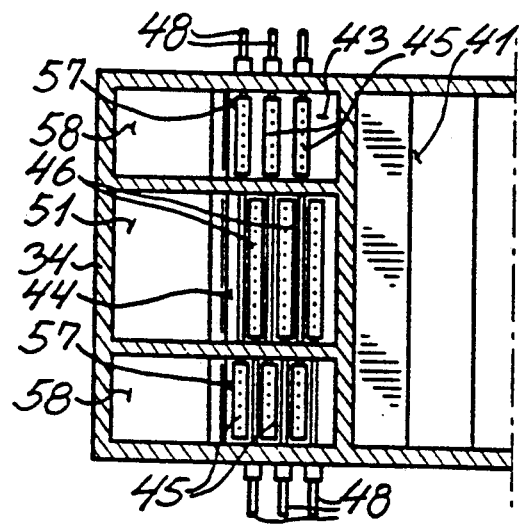
Figure 5:
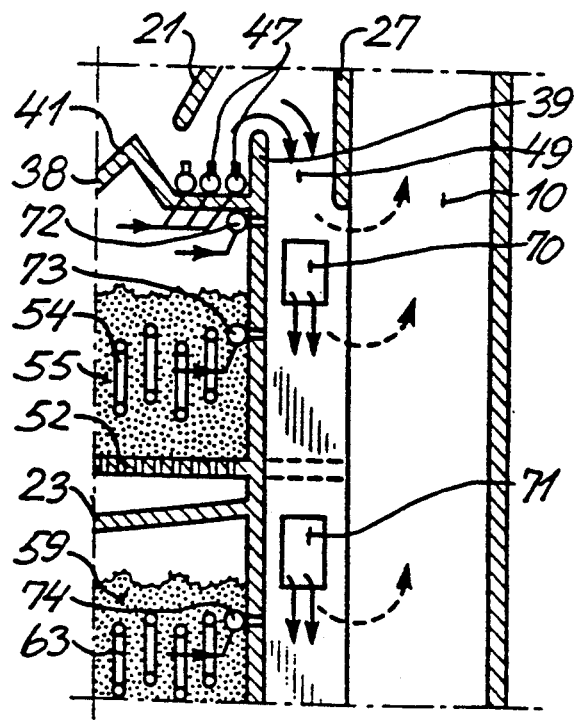

The invention will now be further described with reference to the drawings, wherein FIG. 1 is a longitudinal sectional view of an embodiment of the reactor according to the invention, FIG. 2 is a longitudinal sectional view of a modified embodiment of a particle separator, FIG. 3 is a cross-sectional view along the line III—III in FIG. 2, FIG. 4 is a cross-sectional view along the line IV—IV in FIG. 1, and FIG. 5 is a sectional view illustrating a modified embodiment of the particle return system of the reactor.

The reactor shown in FIG. 1 comprises a vertically extending reactor chamber or combustion chamber 10 having an air distributor 11 at the bottom end thereof. Fluidizing air or gas is supplied through a supply conduit 12 to a gas distributing chamber 13 defined below the air distributor 11. The fluidizing gas preferably comprises primary combustion air, and further combustion air may be supplied through air supply conduits 14 and 15. Fuel may be fed into the reactor chamber 10 through a fuel supply tube 16, which is positioned above the air supply conduits 15.

In operation, a flow of combustion gas and particulate solid material passes upwardly through the combustion chamber 10 as indicated by arrows 17. The combustion gas is discharged from the combustion chamber at the upper end thereof and passed into a particle separator 18 for separating solid particles from the combustion gas, and the combustion gas then passes through an exhaust passage 19, in which a heat exchanger 20 may be arranged. The solid particles separated from the exhaust gas are collected in an upwardly open, hopper-like receptacle 21, and the accumulation 22 of the particles in the receptacle forms a pressure barrier between spaces communicating with the upper and lower ends of the reactor chamber 10, respectively. The receptacle 21 forms part of a particle recycling system 23 for recycling the separated particulate material to the reactor chamber 10 under the control of an electronic control device 24.

The reactor comprising the reactor chamber 10, the separator 18, and the particle recycling system 23 form in combination a coherent unit. The walls of the reactor chamber 10 are preferably gas tight panel walls cooled by a heat transfer medium, such as water and/or steam, and the inner surface of the reaction chamber walls may be provided with a suitable refractory lining. The reactor chamber, and preferably also other parts of the reactor, may have a substantially rectangular cross-section, so that the reactor may to a large extent be built up by substantially plane panels or wall parts. The lower part of the reactor chamber may have a pair of opposite sloping walls so that the cross-sectional area is decreasing towards the fluid bed 11, while the upper part of the chamber 10 may have a substantially uniform cross-section.

The combustion chamber 10 is separated from the space housing the separator 18 and the particle recycling system 23 by means of a partition wall 27, and a combustion gas discharge opening 28 is defined between the upper edge 29 of the partition wall 27 and the top wall 30 of the reactor. A separator inlet passage 31 is defined between the substantially vertical partition wall 27 and a separator wall 32 depending from the top wall 30 of the reactor. Similarly, a separator outlet passage 33 is defined between the separator wall 32 and a reactor wall 34 extending substantially parallel to and transversely spaced from the partition wall 27 so as to form a space therebetween for housing the particle recycling system 23. The separator outlet passage 33 communicates with the exhaust passage 19 for combustion gas via an opening 35 defined between the upper edge of the reactor wall 34 and the top wall 30 of the reactor. As shown in FIG. 1 at least the lower part of the separator wall 32 is converging towards the partition wall 27 and forms an acute angle therewith. Consequently, the gas with entrained particulate solid material flowing from the separator inlet passage 31 to the separator outlet passage 33 is forced to change the direction of flow through an angle exceeding 180°. Simultaneously, the flow velocity of the gas in the separator inlet passage is increased, because the cross-sectional area is decreasing. The abrupt change of flow direction causes that most of the particulate solid matter entrained by the combustion gas is separated therefrom. Some of the particles will impinge on the separator wall 32, which may be provided with a number of parallel grooves or channels formed in the wall surface for receiving such particles. The separated particles leave the grooves or channels as concentrated streams, which are collected in the receptacle 21.

The receptacle 21 defines one or more particle outlet openings 37 at the bottom of the receptacle, and a tray-like particle supporting member 38 are arranged immediately below, but vertically spaced from the bottom part of the receptacle. The particle supporting member also have an upwardly extending flange or rim portion 39 preventing particles from unintentionally flowing over the flange portion 39. The central part 41 of the supporting member 38 is formed like a pitched roof dividing the supporting member into two separated trough-like depressions 42 and 43. As best shown in FIG. 4, the depression 43 is divided into three sections, viz. a central section 44 and two end sections 45. Each of these sections are provided with a group of upwardly directed, fluidizing gas nozzles, 45 and 46 respectively. Similarly, the trough-like depression 43 is provided with a group of gas nozzles 47. Fluidizing gas or air may selectively be supplied to the gas nozzles 45–47 through gas supply conduits 48 under the control of the control device 24. If fluidizing gas is supplied to the gas nozzles 47 in the trough-like depression 43, the non-cooled fluidized particles will flow over the rim portion 39 and fall down through a chute 49, which is partly defined by the partition walls 27 and which opens into the reactor chamber 10 through an opening 50, which is preferably located above and vertically aligned with the fuel supply tube 16. When fluidizing gas is supplied to the gas nozzles 46 in the central section 44 of the trough-like depression 42, fluidized particles flowing over the rim portion 39 fall into a chute 51, which opens on a further fluid bed 55, to which fluidizing gas may be supplied through a conduit 53 and an air distribution plate 52. When the particles are fluidized, they are contacted with a heat exchanger 54, which is embedded in the fluid bed 55. The bed 55 has an overflow 56 communicating with the chute 49. It is understood that when particles are supplied to the fluid bed 55 by supplying fluidizing air to the gas nozzles 46 in the central section 44, a similar amount of particles will flow into the chute 49 through the overflow 56. When fluidizing gas is supplied to the gas nozzles 45 so that the particles in the end sections 57 of the trough-like depressions 43 are fluidized, the fluidized particles will flow over the rim portion 39 and down into a pair of chutes 58. These chutes open into a fluid bed 59, which is located below the fluid bed 55, so that the top wall of the roof wall of the fluid bed 59 is formed by the bottom wall 25 of an air distributing chamber for the fluid bed 55. The bottom of the fluid bed 59 is formed by an air distributing plate 60, to which fluidizing gas may be supplied through a supply tube 61 and a gas distributing chamber 62. The fluid bed 59 contains a heat exchanger 63 and is communicating with the chute 49 through an overflow opening 64.

It is understood that by selectively supplying fluidizing gas to the gas nozzles 45, 46, and 47 it is possible to accurately control not only the recycling of solid particles separated from the combustion gas, but also the amount of heat transferred to the heat exchangers 54 and 63. Because the particles are returned to the reaction chamber 10 as a compact flow emerging through the opening 50 and passing along the oblique chamber wall 65, it is possible to direct the particles to the bottom of the fluidized bed in the reactor chamber 10. Furthermore, this flow of particles along the wall 65 may entrain fuel supplied through the supply tube 16.

In the embodiment of the separator 18 shown in FIGS. 2 and 3, a particle collecting channel 66 is formed at the lower free end of the separator wall 32 for collecting the particles flowing downwardly in the grooves or channels 36. The particles collected in the channel 66 may flow through a row of tubular passages down into the receptacle 21. Furthermore, a labyrinth separator 68 may be mounted between the lower edge of the separator wall 32 and the upper surface of the accumulation of particles 22 so that the combustion gas flowing from the separator inlet passage 31 into the separator outlet passage has to pass the labyrinth separator. As shown in FIG. 3, the labyrinth separator 68 may be formed by several rows of U-section members, and the members in adjacent rows may be offset as shown.

FIG. 5 shows a modified embodiment of the particle recycling system 23 shown in FIG. 1. In FIG. 5, the lower part of the partition wall 27 covering the chute 29 has been removed along a substantial length of the chute 49. Thus, in FIG. 5 the chute 49 is a channel, which has a U-shaped cross-section and which communicates with the combustion chamber 10 along a substantial part of its length. Overflow openings 70 and 71 from the fluid beds 55 and 59, respectively, are defined in the side walls of the channel-like chute 49. Furthermore, gas nozzles 72, 73 and 74 are positioned immediately below the tray-like supporting member 38, the overflow opening 70 and the overflow opening 71, respectively. If none of the diverting gas nozzles 72-74 is operated, the recycling system shown in FIG. 5 will function substantially as described in connection with FIG. 1, because the non-cooled particles discharged from the supporting member 38 and cooled particles discharged from the overflow openings 70 and 71 will fall downwardly through the channel-like chute 49 as a compact flow. If, however, it is not desired to pass the returning particles to the bottom of the reaction chamber 10, but to introduce them into the upwardly flowing gas stream at a higher level, this may be obtained by operating any of the diverting gas nozzles 72-74. Thus, non-cooled particles may be introduced into the upwardly directed gas flow in the reaction chamber 10 by operating the gas nozzle 72, while cooled particles may be introduced into the gas flow by operating any or both of the gas nozzles 73 and 74.

It should be understood that various changes and modifications of the embodiments described above may be made within the scope of the present invention. As an example, diverting means could be provided for selectively connecting the fluid beds 55 and 59 in series, so that the fluid beds 55 and 59 could optionally be connected to the trough-like depression 43 of the supporting member 38 in parallel or in series. In the reactor according to the present invention it is possible to control not only the amount of the particles returned, but also the level at which they are returned to the reaction chamber. All functions of the particle recycling system 23 may be controlled by the control device 24 or other suitable control devices. The reactor may be enclosed in a pressurized container so that it may function as a pressurized reactor, for example as a pressurized combustor or gasifier in combined cycle power systems.

I claim:
1. A circulating fluidized bed reactor comprising
a vertically extending reaction chamber defined by upright walls and a bottom surface, and having an upper part and a lower part, with means for providing a fluidized bed in the lower part comprising means for supplying fluidizing gas from outside the reactor,
said means for supplying fluidizing gas comprising first inlet means for distributing fluidizing gas over the bottom surface and second inlet means in the upright walls,
gas discharge means communicating with the upper part of the reaction chamber for discharging a flow of gas and particulate solid material therefrom, and comprising a separator defining a separator chamber for separating solid particulate material from a flow of gas being discharged, the separator chamber and reaction chamber being arranged side by side,
recycling means for recycling separated particulate solid material from the separator chamber to the reaction chamber and including a downwardly extending recycling passage interconnecting the separator chamber and the reaction chamber, a receptacle in said recycling passage, arranged below the separator chamber for receiving separated particulate solid material from the separator chamber and accumulating particulate material across the width of said recycling passage, thereby forming a pressure barrier across the recycling passage, said receptacle having an upper inlet and an outlet disposed therebelow,
said recycling passage defining at least two separate particle return paths disposed between the receptacle outlet and the reaction chamber for returning particles from the receptacle to the reaction chamber, and including particle discharge means located adjacent to the receptacle outlet for directing particles from the receptacle to the respective return paths, the reaction chamber and the separator chamber being separated by a common partition wall which also separates the reaction chamber from the recycling passage, recycling outlet means comprising at least one opening into said reaction chamber providing fluid communication between said particle return paths and said reaction chamber, at least one said opening being located at a vertical elevation such that it is above both said first and second inlet means, and control means operatively connected to the particle discharge means for controlling the discharge of particles to the respective return paths.

2. A reactor according to claim 1, wherein said common partition wall is upright and substantially planar.

3. A reactor according to claim 1, wherein the reaction chamber is a combustion chamber.

4. A reactor according to claim 1, wherein the maximum cross-sectional area of the receptacle is 0.2-2 times the cross-sectional area of the reaction chamber.

5. A reactor according to claim 1, wherein the particle discharge means comprises a supporting surface located below the receptacle, and gas nozzles for moving particles from the supporting surface selectively into the associated return paths.

6. A reactor according to the claim 1, wherein at least one of said return paths comprises particle cooling means.

7. A reactor according to the claim 1, wherein the particle return means further comprises a path for passing particles to a location outside the reactor.

8. A reactor according to claim 6, wherein the particle cooling means for one or more return paths comprises one or more cooling devices located below the receptacle.

9. A reactor according to claim 8, wherein the cooling devices are arranged in a superposed relationship.

10. A reactor according to claim 6, wherein the return paths comprise fluidizing means for fluidizing the particles passing through the paths so as to bring at least some of the particles into contact with one or more of the cooling devices.

11. A reactor according to claim 9, wherein at least one particle return passage communicating with the reaction chamber is defined between the partition wall and the adjacent cooling devices.

12. A reactor according to claim 9, wherein superposed cooling devices forming part of one of said return paths are connected in series and arranged so that particles may flow only under the influence of gravity from a cooling device into a cooling device located therebelow.

13. A reactor according to claim 9, further comprising diverting means for diverting particles from a cooling device into a cooling device located therebelow.

14. A reactor according to claim 1, additionally comprising fuel inlet means disposed at an elevation between said recycling outlet means and said second inlet means.

15. A reactor according to claim 1, wherein at least one of said return paths opens into said reaction chamber through an outlet defined so as to direct a flow of particles entering said reaction chamber downwardly and parallel to an upright wall.

16. A reactor according to claim 15, wherein said outlet is in fluid communication with a vertically extending channel or groove formed in a chamber wall separating the reaction chamber and the recycling passage.

17. A reactor according to claim 1, wherein at least two of the return paths are in fluid communication with a common path, which is in fluid communication with the reaction chamber.

18. A reactor according to claim 15, wherein the return paths are in fluid communication with the reaction chamber at different levels and at positions which are substantially vertically aligned.

19. A reactor according to claim 18, further comprising means for selectively moving the downwardly directed flow of particles horizontally into the flow of gas and particulate solid material passing upwardly through the reactor chamber.

20. A reactor according to claim 19, wherein said means for moving comprises gas nozzles directed into the reactor chamber.

21. A reactor according to claim 1, wherein the separator chamber comprises a separator inlet passage, comprising means for directing the gas flow oppositely to and in converging relationship with an upward gas flow in the reaction chamber, and a separator outlet passage comprising means for directing gas flow at an angle of at least 90° to the direction of gas flow in the inlet passage.

22. A reactor according to claim 21, wherein the separator inlet and outlet passages are separated by a separating wall extending downwardly into the separator chamber.

23. A reactor according to claim 22, including a common partition wall between the reaction chamber and the separator chamber, wherein the partition wall and the separating wall converge in a downward direction.

24. A reactor according to claim 22, wherein channels or grooves extending substantially in the direction of gas flow are formed in a surface of the separating wall within the inlet passage.

25. A reactor according to claim 22, wherein an upwardly open particle collecting channel is formed in a lower end of said separating wall.

26. A reactor according to claim 25, further comprising channel or tube members communicating with the collecting channel and extending towards said receptacle.

27. A reactor according to claim 24, further comprising longitudinally extending channel or tube members aligned with said grooves or channels and extending towards said receptacle.

28. A reactor according to claim 21, further comprising a labyrinth separator interconnecting the separator inlet and outlet passages.

29. A reactor according to claim 1, wherein the reactor chamber, the separator chamber and the recycling means are further defined between first and second pairs of upright walls defining a housing having substantially rectangular horizontal cross sections.

30. A circulating fluidized bed reactor comprising
a vertically extending reaction chamber having an upper part and a lower part, with means for providing a fluidized bed in the lower part,
gas discharge means communicating with the upper part of the reaction chamber for discharging a flow of gas and particulate solid material therefrom, and comprising a separator defining a separator chamber for separating solid particulate material from a flow of gas being discharged, the separator chamber and reaction chamber placed side by side, recycling means for recycling separated particulate solid material from the separator chamber to the reaction chamber and including a downwardly extending recycling passage interconnecting the separator chamber and the reaction chamber, a receptacle in said recycling passage, arranged below the separator chamber for receiving separated particulate solid material from the separator chamber and accumulating particulate material across the width of said recycling passage, thereby forming a pressure barrier across the recycling passage, said receptacle having an upper inlet and an outlet disposed therebelow, said recycling passage defining at least two separate particle return paths disposed between the receptacle outlet and the reaction chamber for returning particles from the receptacle to the chamber, and including particle discharge means located adjacent to the receptacle outlet for directing particles from the receptacle to the respective return paths, the reaction chamber and the separator chamber being separated by a common upright, substantially planar partition wall which also separates the reaction chamber from the recycling passage, and which extends downwardly beyond said receptacle outlet a distance sufficient to create said at least one particle return path directing a flow of particles entering said reaction chamber downwardly and parallel to said upright partition wall, and control means operatively connected to the particle discharge means for controlling the discharge of particles to the respective return paths.

* * * * *